Aug. 27, 1957  R. E. ROGERS  2,804,047
INSECTICIDE APPLICATOR FOR ANIMALS
Filed May 13, 1954
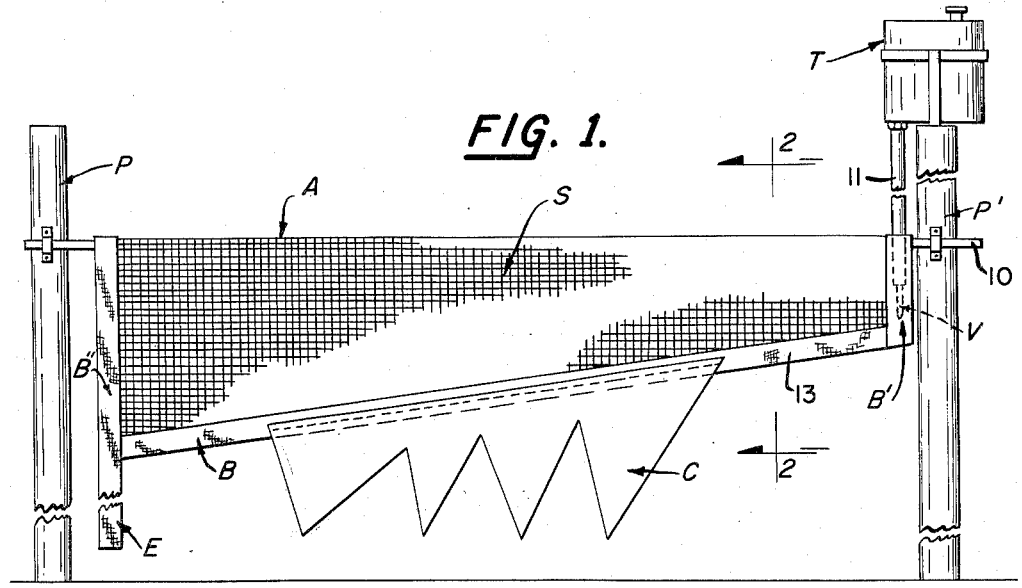
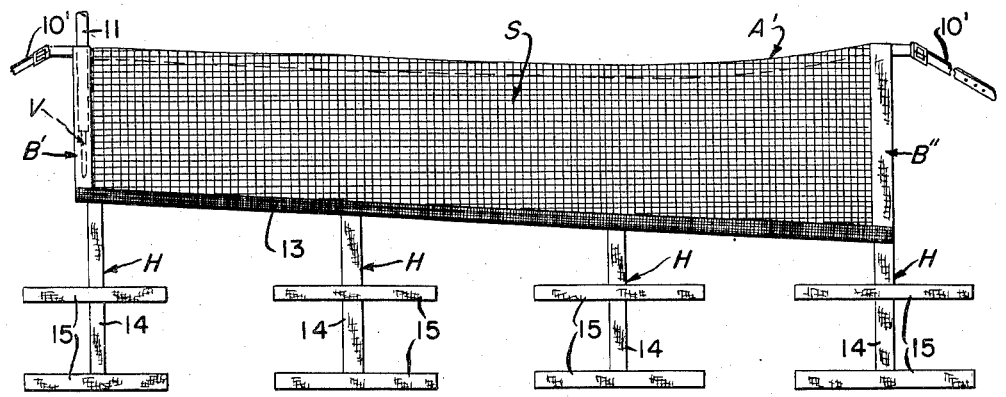
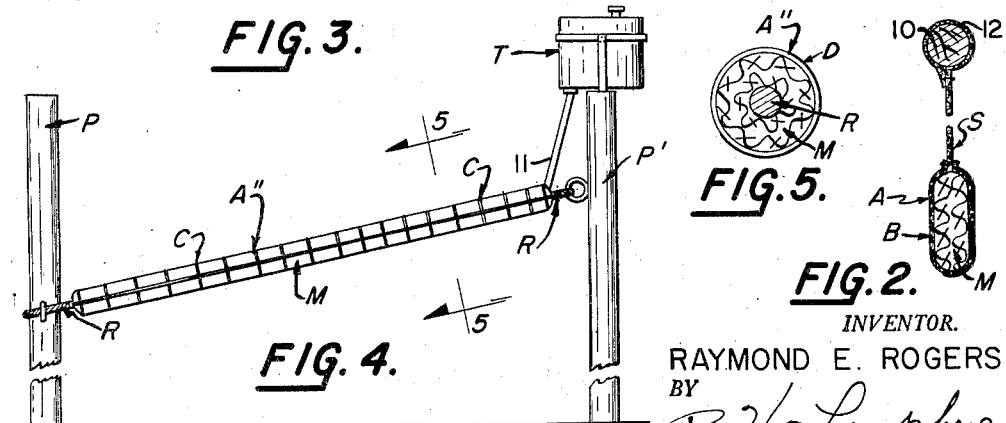
INVENTOR.
RAYMOND E. ROGERS
BY
ATTORNEY

United States Patent Office 2,804,047
Patented Aug. 27, 1957

2,804,047

INSECTICIDE APPLICATOR FOR ANIMALS

Raymond E. Rogers, Denver, Colo.

Application May 13, 1954, Serial No. 429,429

8 Claims. (Cl. 119—157)

This invention relates to applicators for applying insecticides or like chemicals to animals and more particularly to an applicator which can automatically apply the insecticide by movement of the animal relative to the applicator whereby a wiping action will occur and the insecticide or other chemical will be transferred to the body of the animal.

One of the objects of my invention is to produce an improved applicator which will apply insecticide or other chemicals to an animal in a uniform and efficient manner over a long period of time.

Another object is to produce an improved applicator of the type in which absorbent material is employed to hold the insecticide ready for application to the animal, with the applicator being so constructed that the absorbent material will be protected against wear over long periods of use yet will not interfere with the absorbent material applying the insecticide or other chemicals to the animal by the wiping action when the animal contacts and moves relative to the applicator.

Still another object is to produce an improved applicator which can be suspended between two space points in a manner that the animal can make easy contact therewith so that the insecticide or other chemical can be efficiently transferred to the hide of the animal.

Yet another object of my invention is to produce an improved sheet type of applicator for suspension across a gate through which the animal will walk and will be so constructed that as the animal passes through the gate the insecticide will be applied to the animal on its back and also to its sides.

Yet a further object is to produce an improved insecticide applicator for animals which will embody therein absorbent material in such a manner as to assure a minimum absorbed supply of insecticide yet sufficient to produce efficient application of the insecticide to animals over long periods of time and varying interval uses by an animal.

A more specific object is to provide in an applicator of the kind referred to absorbent material as the insecticide holder and to cover such with a wear resistant open or perforated material such as woven wire, woven synthetic material or similar material.

Other objects of my invention will become apparent from the following description taken in connection with the accompanying drawing in which:

Figure 1 is a front view of an applicator embodying my invention, such being of the sheet type which is suspended between two posts acting as a gate for animals as they pass therethrough; and Figure 2 is an enlarged sectional view taken on the line 2—2 of Figure 1 showing details of construction of the applicator;

Figure 3 is a view of another sheet type of applicator also embodying my invention, such being similar to that shown in Figure 1 but modified so as to be capable of simultaneously applying insecticide in larger quantities and over a greater surface of the animal's hide, particularly its sides and lower portions such as legs and belly.

Figure 4 is a view showing a rubbing type of applicator also embodying my invention which is shown as suspended between two posts acting as a gate; and Figure 5 is an enlarged sectional view taken on the line 5—5 of Figure 4 showing details.

Referring to Figures 1 and 2 in detail the applicator disclosed which embodies my invention is indicated generally by the letter A and is in the form of a sheet for suspension between two posts P and P' which form a gate through which an animal can pass. Generally these posts will be at a gap in a fence forming a corral to and from which animals pass as for example, in watering or the posts could form a gate in a fence which surrounds a watering hole or a salt area of a range and through which the animal must pass in going to and from the range during watering or obtaining salt. The applicator is shown as suspended from a cross rod 10 having its ends suitably mounted on the two posts. Other suspending means as planks, ropes, cables, straps, etc. can be used. The applicator as shown is arranged to have the insecticide or other chemicals supplied thereto from a supply tank T of a desired capacity, which as shown is mounted on the top of the post P'. From this tank a flexible tube 11 will conduct the insecticide by the action of gravity into one end of the applicator which is shown as the narrower end. In order that the tube will supply the proper amount but not an excessive amount of insecticide to the applicator, a special valve structure V can be employed which preferably is one of the type shown in the co-pending application of Raymond E. Rogers and David C. King, Serial No. 406,472, filed January 27, 1954, for Liquid Control Apparatus, now U. S. Patent No. 2,758,567. With this valve structure a controlled amount of insecticide will be transferred in a continuous manner to the applicator and particularly absorbent material as will become apparent.

The applicator as shown in Figures 1 and 2 is made from a suitable sheet S of suitable flexible mesh, perforated, or other open material. One of the purposes of this sheet is to form a curtain which will give the animal an appearance of being an obstacle so that it will instinctively lower its head to go under the bottom edge of the applicator. The sheet S will also give body to the applicator and aid in the proper hanging and supporting thereof from the rod or other member from which it is suspended between the posts.

The construction of the sheet S is important. I prefer to make it from some mesh, perforated, or open material that has good wear characteristics. The size of the openings is important because it should allow passage of air therethrough so that wind will not swing the applicator up so that it will not be effective in wiping the animal as it passes thereunder. The sheet also should not have openings of a size that horns of the animal will be easily caught therein so as to cause damage by the animal "fighting" the applicator. Also the mesh should be small enough so it appears to the animal as a suspended barrier to go under. Mesh material which I have found to be suitable includes wire mesh, glass cloth, screen of a suitable metal, a mesh material made from a suitable plastic material or any wear resistant fibers, and also any sheet material that is provided with perforations or an open construction whether caused by weaving, cutting, moulding or otherwise. As to size of mesh or opening I have determined from experiment that the opening should have a cross distance not appreciably greater than one fourth inch. If it is greater a sharp horn of an animal such as a cow or bull can be received therein and the result will be damage to the sheet and applicator.

The upper edge of this sheet S can be hemmed along the top edge to form a tunnel 12 into which the rod 10 will be inserted. The sheet S is formed at its bottom to have a sloping or angular edge 13. This lower edge and the two end edges are provided with borders B' and B" which are made of a suitable folded fabric which has relatively good wear characteristics such as, canvas, burlap in double or triple thickness, synthetic materials such as nylon and the like. Also this absorbent material can be covered with a mesh material is desired such as woven wire, wire screen, etc., and in many instances this will be preferred. Within these three border structures are placed absorbent material M which can be cotton batting, absorbent waste material, a cellulose product, wool fibers, wicking material, or any suitable material which can absorb a considerable amount of liquid, particularly the insecticide or chemical which is to be dispensed to the hide of the animal by the applicator.

The wide end of the applicator has its border B" extending some distance beyond the bottom edge border (either by an integral portion or an attached portion) to form a hanging or tail E which extension or tail will preferably also contain absorbent material M in the same manner as the border structures. With this extension E there will be provided a part which will contain the insecticide and be so placed that it can have a wiping action along the lower side of the animal while the animal's back is being wiped by the border B along the bottom angular edge of the applicator.

It will be noted that when the applicator A is installed the insecticide will be supplied to the border B' at the narrow end of the applicator. The amount of insecticide will depend on various conditions involved, such as the number of animals which are to use the applicator, the amount of use per animal per time element, such as per day, the characteristics of the insecticide, specific insecticide job to be done, etc. This will all be controlled by the valve means V. By feeding the insecticide into the border B at the narrow end it will then be absorbed by the absorbent material M and then will move by gravity and capillary action down the angular border B at the lower edge of the applicator and into the extension E hanging from the border at the wide end of the applicator. As a result the entire borders and extension will be soaked with the insecticide to such an extent that an animal moving underneath the applicator can have wiped upon its hide such sufficient insecticide as to be beneficial in repelling insects and also in destroying any insects, bugs, lice, etc. which might be on the hide or in or on the hair of the animal. The lower edge of the applicator will be hung at such a height from the ground that the angular border will be dragged over the back of the animal and simultaneously the extension E will be dragged along one side of the animal, including the legs. Thus, the back and lower portions of one side of the animal's body will have insecticide applied thereto. As the animal will use the gate in two directions, then when the animal returns to pass through the gate the back again will be wiped with insecticide and the opposite side will be wiped with insecticide by the wider part of the applicator.

The applicator A may be desired to be mounted to take care of efficient application of insecticide for the matured animals and may not do an efficient job for younger animals. If such should be the situation a sheet of fabric C can be sewed or otherwise attached to the lower edge border. No absorbent material need be carried in this sheet. The sheet can be cut as shown to form pennant extensions, and it can be shredded so the smaller animal will be wiped thereby as the fabric will be soaked sufficiently by capillary and gravity flow of insecticide from the border.

In Figure 3 I have shown a slightly different form of sheet type of applicator which applicator is indicated by the letter A'. It is shown as being hung upon a strap 10' having buckles for easy attachment to the posts. The applicator is fed from a supply tank through a tube 11 to the border structures B which are on the two ends of the applicator and along the lower edge. These borders will contain absorbent material in the same manner as the applicator A of Figures 1 and 2. The applicator A' is also made with a greater width at one end than the other and the narrow end is used to receive the insecticide from the supply tank and conduct it by capillary action and gravity along the borders. In the applicator A' there is a sheet S of flexible mesh, perforated or open material of good wear characteristics as already described.

Suspended from the lower border B edge of the applicator A' are a plurality of hangings H constructed from elongated strips, each of which is made from suitable cloth fabric or similar material in which is contained absorbent material. As shown, each hanging has a vertical piece 14 to which is suitably attached cross pieces 15, shown as two but they could be of any desired number. The cross pieces are strengthened by the inclusion therein of metallic elements. The number of hangings is shown as four but these could be varied as desired. The purpose of these hangings is to give additional application of insecticide to the sides and all lower portions of the animal besides the back of an animal as it passes beneath the applicator A'. It may be that a greater amount of insecticide is desired to be applied to the animal, particularly along the lower portions thereof, and because of the hangings H carried by the applicator of Figure 2 and having the special construction, this can be accomplished in an efficient manner, more so than it would be possible from a single hanging extension such as E of the applicator of Figure 1. Of course, if the multiple type of hangers H shown in Figure 3 are desired to be used on the Figure 1 applicator, this could be done.

In Figure 4 there is disclosed still another form of applicator which is of the rub or scratch type of applicator and is indicated by the letter A". This applicator is mounted between the posts P and P' which acts as a gate and the post P has mounted thereon a supply tank T of which the insecticide is supplied to the applicator through the tube 11. The applicator A" is constructed around a central member R which could be a rope, chain, cable or even a rod or pole. Whatever is used, it should be strong enough to hold up under rubbing action by an animal yet somewhat flexible so that it will not readily break. Around this central member R is wrapped absorbent material M such as cotton batting or other material already mentioned and this absorbent material is then covered with a protecting covering D which can be wire cloth, hardware cloth, poultry fence, woven wire, screen wire or any other tugh and wear resistant material even including synthetic materials such as woven glass, nylon and the like. The mesh of these materials need not be limited as the animal will have only a rubbing action on the applicator and hooking a horn therein is not likely as in the suspending sheet S of the applicators of Figures 1 and 3.

The applicator is mounted between the posts so as to be at an angle sloping from one end to the other end by a central member R acting as the support for suspending the applicator between the posts. The higher end of the applicator will receive the insecticide from the tank through the tube 11 in a controlled manner by use of a suitable valve. The height of the applicator should be such that the animal when passing beneath it can rub the applicator along its back and part of its side and transfer to its hide insecticide which is carried by the absorbent material M.

I am aware of other modifications in my improved applicator besides those disclosed. Therefore, I desire it to be understood that the scope of my invention is not to be limited to any specific disclosure but is to include the fundamental principles involved as defined by the

What is claimed is:

1. A liquid applicator for animals comprising a sheet made of flexible mesh and having end edges and top and bottom edge borders spaced apart a substantial distance thereby forming a foraminous curtain-like sheet, means operatively connected with said sheet for suspending the sheet so that the end edges are substantially upright and an animal may have wiping contact therewith at the bottom border, the bottom border being constructed to slope downwardly from one end edge to adjacent the other end edge when suspended, liquid insecticide conducting means throughout the majority of the bottom border, an insecticide supply means operably associated with said sheet, and means connected with said supply means for transferring a controlled amount of insecticide to the conducting means adjacent the one end edge whereby there is movement of insecticide by gravity through the bottom border.

2. A liquid applicator for animals as defined in claim 1 wherein the conducting means extends throughout the bottom border and there is provided at the one end edge additional liquid insecticide conducting means connected with the bottom border.

3. A liquid applicator for animals as defined in claim 2 wherein a protective wear resistant convering through which the insecticide may be transferred is provided for the conducting means.

4. A liquid applicator for animals as defined in claim 1 wherein said other end edge is provided with liquid insecticide conducting means in the form of a tail depending therefrom and below the bottom border, said tail being connected with the conducting means of the bottom border whereby insecticide may be transferred to the animal thereby.

5. A liquid applicator for animals as defined in claim 1 wherein the bottom border has suspended therefrom at least one hanging for transferring insecticide from the conducting means of the bottom border whereby insecticide may be transferred to the animal from the hanging.

6. A liquid applicator for animals as defined in claim 4 wherein the hanging is constructed of absorbent material provided with a protective coating.

7. A liquid applicator for animals as defined in claim 1 wherein the bottom border has depending therefrom a plurality of spaced hangings constructed of absorbent material for transferring insecticide from the conducting means of the bottom border whereby insecticide may be transferred to the animal from the hangings.

8. A liquid applicator for animals as defined in claim 7 wherein each hanging includes a vertical strip and at least one cross strip attached thereto.

References Cited in the file of this patent

UNITED STATES PATENTS

| | | |
|---|---|---|
| 974,042 | Dresback et al. | Oct. 25, 1910 |
| 1,492,142 | Shoemaker | Apr. 29, 1924 |
| 1,577,938 | Stanton | Mar. 23, 1926 |
| 1,921,901 | Anderson | Aug. 8, 1933 |
| 2,444,212 | Weaklend | June 29, 1948 |
| 2,521,817 | Andresen et al. | Sept. 12, 1950 |
| 2,573,873 | Rhoades | Nov. 6, 1951 |
| 2,653,575 | Worden | Sept. 29, 1953 |
| 2,667,859 | Murray et al. | Feb. 2, 1954 |
| 2,669,968 | Rasmussen | Feb. 23, 1954 |
| 2,711,722 | Gray | June 28, 1955 |